United States Patent
Lavie et al.

(10) Patent No.: US 6,644,031 B2
(45) Date of Patent: Nov. 11, 2003

(54) FUEL INJECTOR WITH AN OPTIMIZED METERING DEVICE

(75) Inventors: Alain Lavie, Yerres (FR); Stéphanie Martelli, Paris (FR); Marion Michau, Vincennes (FR); José Rodrigues, Nandy (FR); Alain Tiepel, Chailly en Biere (FR)

(73) Assignee: SNECMA Moteurs, Paris (FR)

( * ) Notice: Subject to any disclaimer, the term of this patent is extended or adjusted under 35 U.S.C. 154(b) by 0 days.

(21) Appl. No.: 09/988,525

(22) Filed: Nov. 20, 2001

(65) Prior Publication Data

US 2002/0059799 A1 May 23, 2002

(30) Foreign Application Priority Data

Nov. 21, 2000 (FR) .............................. 00 15005

(51) Int. Cl.$^7$ ................................. F02C 1/00
(52) U.S. Cl. ............... 60/740; 60/746; 239/88; 239/95; 239/533.9
(58) Field of Search .......... 60/740, 741, 746; 239/88, 95, 533.1–533.4, 533.7, 533.9, 533.11

(56) References Cited

U.S. PATENT DOCUMENTS

| | | | | |
|---|---|---|---|---|
| 3,782,352 A | * | 1/1974 | Sparber | 123/139 AJ |
| 4,099,894 A | * | 7/1978 | Indra | 417/499 |
| 4,491,272 A | | 1/1985 | Bradley et al. | |
| 4,570,668 A | | 2/1986 | Burke et al. | |
| 4,605,171 A | * | 8/1986 | Trachte et al. | 239/453 |
| 4,938,418 A | | 7/1990 | Halvorsen | |
| 5,020,315 A | * | 6/1991 | Leachman, Jr. et al. | 60/39.821 |
| 5,694,967 A | * | 12/1997 | Schultz | 137/118.02 |
| 6,012,644 A | * | 1/2000 | Sturman et al. | 239/96 |

FOREIGN PATENT DOCUMENTS

| | | | |
|---|---|---|---|
| DE | 3139288 A1 | * | 4/1983 |
| GB | 2118624 A | * | 11/1983 |

* cited by examiner

Primary Examiner—Charles G. Freay
Assistant Examiner—John F. Belena
(74) Attorney, Agent, or Firm—Oblon, Spivak, McClelland, Maier & Neustadt, P.C.

(57) ABSTRACT

A fuel injector has a metering valve arranged to open under a predetermined feed pressure which constitutes a first threshold pressure, and to remain open in response to said feed pressure increasing so as to deliver fuel to fuel utilization means. The flow rate of fuel passing through the injector is metered to feed said utilization means so long as the feed pressure remains below a second threshold pressure greater than the first threshold pressure. Above the second threshold pressure, the metering valve behaves like a fixed diaphragm as a function of the fluid flow sections formed therethrough. Individual adjustment means are provided so as to enable said second threshold pressure to be adjusted for each injector to ensure that fuel is injected at a uniform flow rate by all of the injectors in a combustion chamber.

38 Claims, 3 Drawing Sheets

FUEL INJECTOR WITH AN OPTIMIZED METERING DEVICE

FIELD OF THE INVENTION

The present relates to the general field of devices for adjusting a fluid flow, and it relates more particularly to fuel injectors in a turbomachine combustion chamber.

PRIOR ART

The rate at which fuel is fed into a turbojet or a turboprop (referred to below as a "turbomachine") is adjusted by means of injectors which are designed to deliver a first flow of "main" fuel while the turbomachine is in a starting stage and when operating at low power ("idling"), and a second flow of "secondary" fuel during subsequent stages of operation all the way to full power.

French patent application No. FR 2 540 186 illustrates a typical example of a fuel injector for a turbomachine that comprises firstly a stop valve whose spring is adjusted in such a manner as to open at a predetermined fuel feed pressure corresponding to the starting stage and to remain open above said predetermined pressure, and secondly a metering valve whose spring is adjusted to open at a feed pressure that is also predetermined but higher than the starting pressure, and that remains open at higher pressures, i.e. up to the maximum pressure of use. During the second stage, fuel flow rate is adjusted by grooves machined in the metering valve and having flow sections that are designed to track the progressive variation in flow rate in application of a predetermined relationship depending on the feed pressure. The initial loading of the spring defines a first action threshold for the metering valve and is set by means of an annular spacer.

That prior art nevertheless suffers from a major drawback. The flow rate of fuel that corresponds to the metering valve being fully open (when the engine is at full power) depends essentially on the mechanical characteristics of the spring and on the flow sections of the grooves (friction in the valve is also involved but to a much lesser extent). Unfortunately, the tolerances that exist in the manufacture or machining both of the spring and of the grooves are such that this maximum flow rate cannot be identical for all of the injectors of a given engine. FIG. 6 shows the spread of flow rate differences $\Delta Q_1$, $\Delta Q_2$ that can exist between two different injectors 100, 102 in the same combustion chamber as compared with a calculated ideal flow rate 104. This results in great non-uniformity of flow rate between injectors which is particularly harmful to proper operation of the turbomachine.

OBJECTS AND DEFINITION OF THE INVENTION

An object of the present invention is thus to provide a fuel injector which makes it possible to reduce flow rate non-uniformity between the various injectors in a common combustion chamber to a considerable extent. Another object of the invention is to provide a device which makes it possible for the adjustment of fuel injection flow rates into the combustion chamber to be made simpler and more reliable for each of the injectors. Another object of the invention is to provide a device which also makes it possible to save time when individually adjusting these flow rates. A further object of the injector is to provide a device that is capable of overcoming friction in the metering valve of such an injector.

These objects are achieved by a fuel injector for a turbomachine combustion chamber, the injector comprising an injector body having means for admitting fuel under pressure, a first valve mounted downstream from said means for admitting fuel under pressure and responding to a predetermined fuel admission pressure to admit fuel into said injector body, a second valve mounted downstream from said first valve and responding to a first determined fuel pressure S1, greater than said admission pressure to deliver a fraction of the fuel admitted into said injector body to fuel utilization means, the second valve metering the flow rate of fuel injected to said utilization means up to a second determined fuel pressure S2, greater than said first pressure, above which said second valve behaves like a fixed diaphragm as a function of the flow sections formed through said second valve, the injector further comprising means for individually adjusting said second determined fuel pressure so as to ensure that fuel is injected at a uniform rate into the combustion chamber.

With this particular structure, and at high flow rates (above the second determined pressure S2), any dispersion in the flow rate characteristics of the utilization means is avoided and adjustment of the maximum flow rate at which fuel can be injected is made considerably simpler.

Advantageously, the adjustment means comprise an abutment for limiting the stroke of said metering valve to a determined value which corresponds to a desired maximum value for the injection flow rate of fuel, and said stroke-limiting abutment preferably comprises a ring fixed on said metering valve for the purpose of co-operating with a bushing in which said valve can move.

BRIEF DESCRIPTION OF THE DRAWINGS

The characteristics and advantages of the present invention appear more clearly from the following description given by way of non-limiting indication and with reference to the accompanying drawings, in which.

DETAILED DESCRIPTION OF A PREFERRED EMBODIMENT

Figure 1:
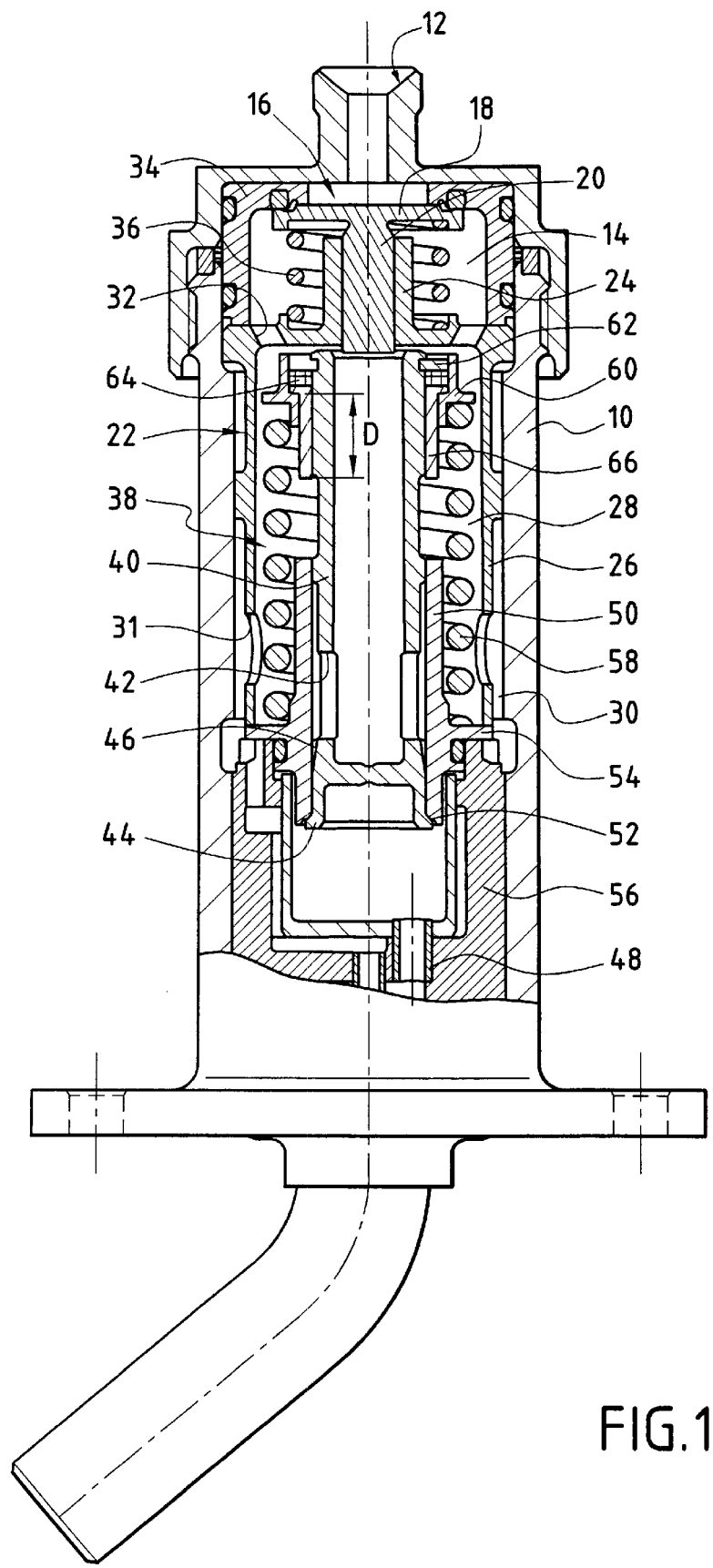
FIG. 1 is a section view showing a turbomachine fuel injector of the invention.

FIG. 1 shows a fuel injector for a turbomachine combustion chamber. This injector can be a so-called "pilot" injector for use in starting, in which case the injector is in operation all the time that the engine is running, or it can be a "main" injector for use during cruising, in which case it can either be in operation or extinguished while the engine is running. The injector comprises an injector body 10, a fuel admission orifice 12 for receiving the fuel under pressure from a suitable fuel pump (not shown) and opening out into an inlet chamber 14 for fuel flow inside this injector body. A shut-off valve 16 for sealing the injector when not in operation and conventionally constituted by a valve head 18 and a valve stem 20 is mounted in said fuel inlet chamber and is held in position by means of a sleeve 22 whose central tubular portion 24 forms a valve support and which further includes a peripheral cylindrical portion 26 which extends downstream from said central portion over a large fraction of the remaining inside volume of the injector body 10, and which defines an internal chamber 28 for secondary fuel and an annular chamber 30 for main fuel disposed around it and communicating therewith via transverse bores 31. The secondary fuel chamber 28 is connected to the fuel inlet chamber 14 via calibrated bores 32 pierced regularly around the valve support 24. The seat of this valve is 24 formed by a shoulder of a cylindrical jacket 24 resting on the sleeve 22 and a helical spring 36 placed between the valve support 34 and the valve head 18 for the purpose of adjusting the pressure at which fuel is admitted into the inlet chamber and above which the shut-off valve opens (for example 1.5 kilograms per square centimeter ($kg/cm^2$)).

A metering device 38 for metering the fuel flowing from the secondary fuel chamber 28 is mounted directly in said chamber and comprises firstly a tubular metering valve 40 provided with transverse secondary fuel flow bores 42 and a closed end from which there emerges a circular shoulder 44 forming a valve head. This end also has grooves 46 which are very accurately shaped in order to meter the fuel flowing from the secondary fuel chamber 28 through the transverse bores 42 to a secondary fuel ejection channel 48.

The metering valve 40 can slide in a cylindrical bushing 50 having one end which includes a circular recess 52 forming a valve seat. This bushing is held fixed inside the injector body 10 by means of a collar 54 which is clamped between the end of the sleeve 22 remote from the valve support 24 and a bushing support piece 56. The collar also forms a bearing surface for a first end of a helical spring 58 whose other end is mounted in a cup-shaped retaining element 60 engaged on the end of the valve that is remote from the valve head and fixed to said tubular valve by means of a C-shaped ring 62. An annular spacer 64 is placed between the C-shaped ring and the retaining element to adjust the loading of the spring 58 and define a first action threshold S1 for the metering valve. This loading is selected in such a manner as to enable the metering valve to open at a predetermined fuel pressure (e.g. 10 $kg/cm^2$), higher than the pressure that opens the shut-off valve 16 which corresponds to the starting pressure, and to remain open with increasing feed pressure (the delivered flow rate then being a function of the flow sections of the grooves 46).

In accordance with the invention, the metering device 38 is also provided with an adjustment abutment to define a second action threshold S2 of the metering valve which is identical for all of the injectors in a given combustion chamber, and beyond which the valve behaves like a fixed diaphragm whose characteristics are then completely independent of the machining characteristics of the spring or of the grooves and indeed independent of the friction characteristics of the valve. This variable abutment serves to limit the stroke of the metering valve and thus the injection flow rate of fuel to a predetermined maximum value which corresponds to said second action threshold, which is identical for all of the injectors.

Figure 5:
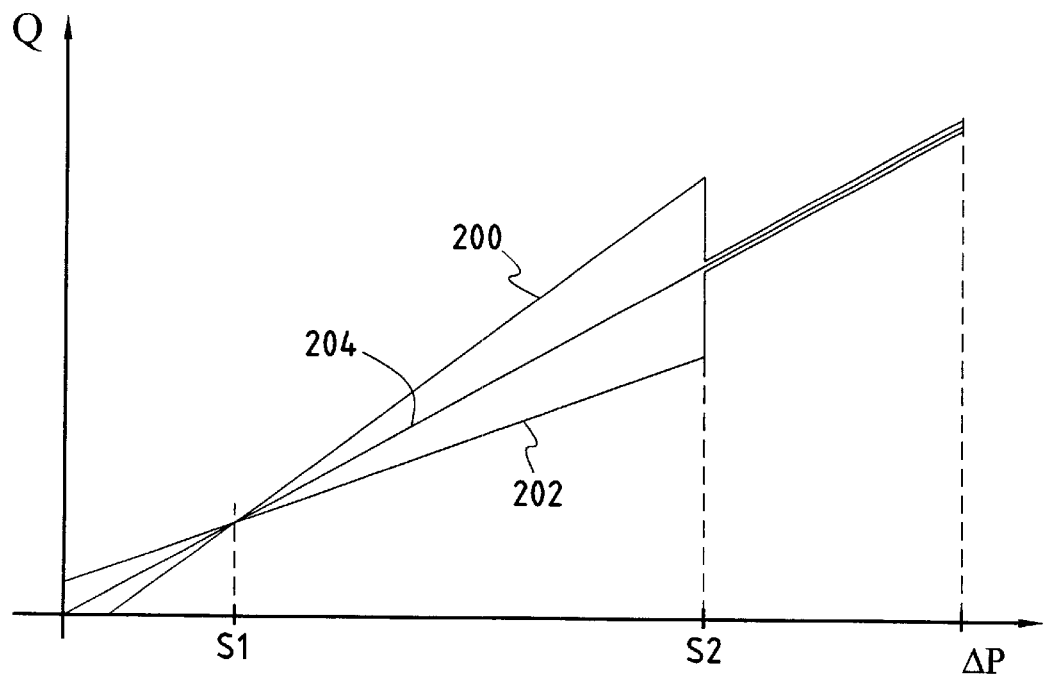
FIG. 5 is a graph giving an example of injection flow rate curves in a turbomachine that uses FIG. 1 fuel injectors.
Figure 6:
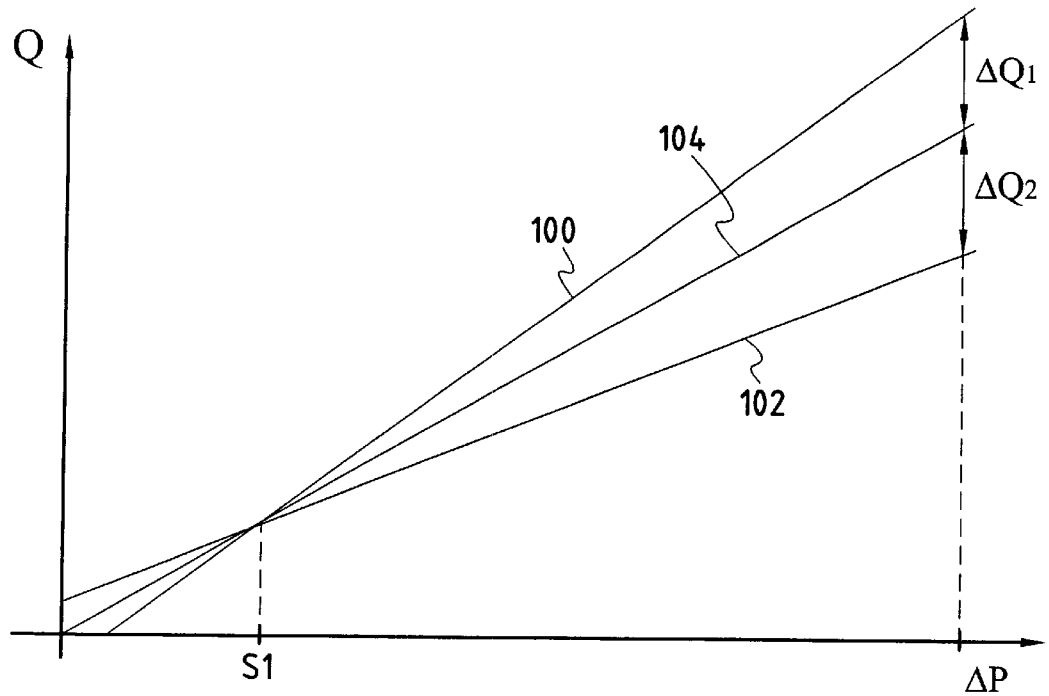
FIG. 6 is a graph showing an example of injection flow rate curves applicable to a prior art turbomachine.

FIG. 5 shows clearly the effect of this adjustment abutment on the flow rate differences that can exist over the operating range of the turbomachine, at two different injectors 200, 202 in the same combustion chamber and compared with a calculated ideal flow rate 204. This abutment can be constituted, for example, by a ring 66 mounted on the end of the metering valve that is remote from the valve head, and which is adjusted individually (by machining the length D of the ring) so as to define for each injector a predetermined fuel pressure that is common with the other injectors and that corresponds to a flow rate close to fully open (e.g. 30 $kg/cm^2$). It may be observed that it is equally possible to envisage mounting this abutment at the bushing 50 so that it co-operates with the retaining element to limit the stroke of the metering valve 40.

The metering device of a fuel injector of the invention operates as described below with reference to FIGS. 2 to 4.

Figure 2:
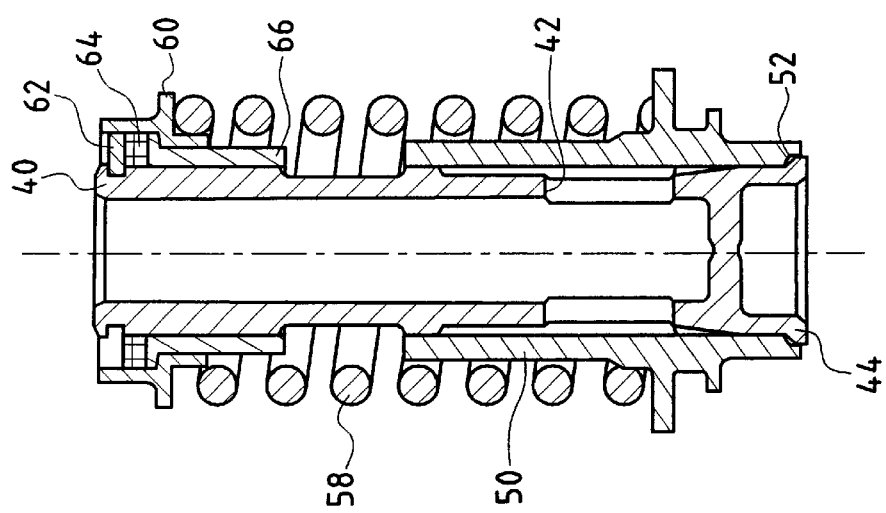

FIG. 2 shows the metering device 38 in an initial or rest position in which the closed metering valve 40 is at rest against its seat 52. No secondary fuel is thus fed to the injector which is fed with main fuel only from the inlet chamber 14, which fuel passes in succession through the calibrated bores 32, the secondary chamber 28, and the transverse bores 31 in the sleeve 22 (naturally it is assumed that the shut-off valve 16 is open).

Figure 3:
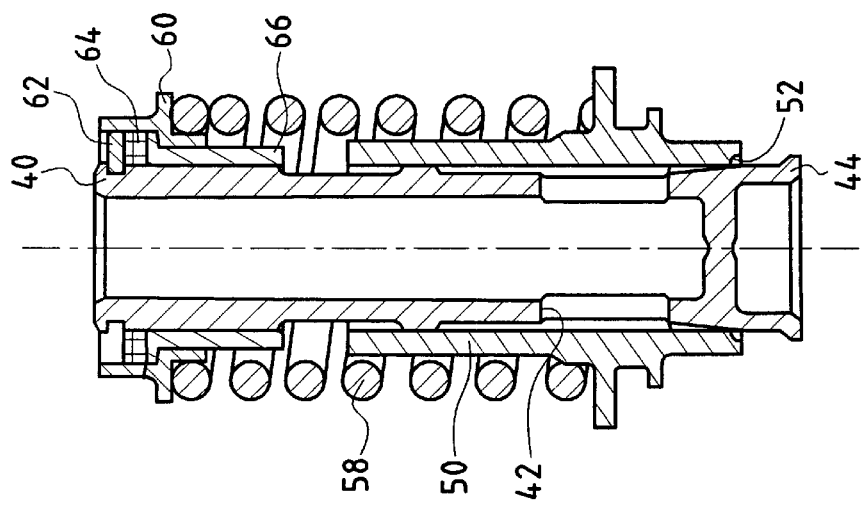

In FIG. 3, the metering device is in an intermediate position in which, under the effect of feed pressure greater than the threshold S1, the spring 58 is compressed, thereby causing the valve 40 to be half open. The fuel present in the secondary chamber 28 then penetrates into said valve and leaves via the transverse through bores 42 and via the grooves 46 so as to feed the injector with a secondary flow of fuel which is combined with the above-described main fuel flow. The varying flow sections of the grooves serve to adjust the secondary injection flow rate.

Figure 4:
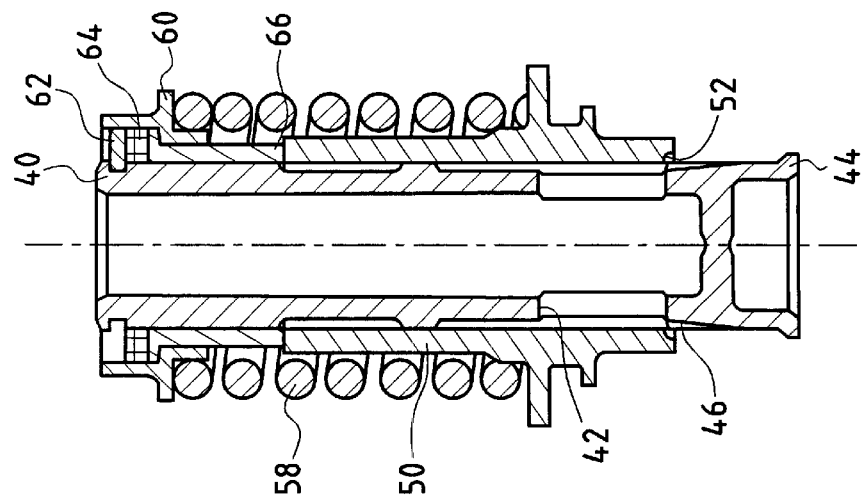
FIGS. 2 to 4 are section views of the metering device of the FIG. 1 injector, showing how it works.

Finally, FIG. 4 shows the metering device in its fully open position corresponding to feed pressure greater than the threshold S2 and in which the metering valve 40 is in abutment, the ring 66 coming into contact with the end of the bushing 50 and preventing any further displacement of the valve regardless of the pressure at which fuel is fed. In this end position which is adjustable by adjusting the dimension D, the flow sections of the grooves no longer vary and the valve thus behaves like a fixed diaphragm (whose flow rate characteristics depend solely on the size of the ring) thus eliminating all problems of dispersion that are to be found in the prior art.

With the invention, injection flow rate is adjusted not only when the metering valve opens for low flow rates (threshold S1) but also when it is fully open for flow rates that are much greater (threshold S2). This adjustment at full opening is performed individually for each injector so as to obtain identical fuel flow in the combustion chamber regardless of the individual and necessarily different mechanical characteristics of each of the injectors (in particular the characteristics of their springs 58). This clearly simple modification to the metering device, constituted merely by adding an adjustment ring of length D that varies from one injector to another as a function of the individual mechanical characteristics of each of the injectors provides a considerable improvement in overcoming non-uniformity of flow rate between injectors at full power since it is no longer necessary to resort to very high precision machining for all of the components of the injector in order to obtain uniform flow rate, but only of the ring 66. In addition, adding this component makes it possible to achieve greater reliability in adjustment of the flow rate to be measured and also makes it possible to save adjustment time, since full power adjustment depends on one parameter only, namely the size of the abutment ring, and not on the flow sections of the grooves and the resilient characteristics of a spring.

What is claimed is:

1. A fuel injector comprising:
   an injector body including an inlet for receiving fuel under pressure and first and second fuel outlet paths;
   a first valve located so as to be responsive to a first predetermined threshold fuel pressure so as to admit fuel into said injector body, a first portion of the fuel in said injector body leaving said injector body through said first fuel outlet path;

a second valve associated only with said second fuel outlet path and being responsive to a second predetermined threshold fuel pressure higher than said first predetermined threshold fuel pressure so as to selectively permit another portion of the fuel in said injector body to leave said injector body through said second fuel outlet path, said second valve including a fuel flow opening that increasingly varies in area in proportion to a fuel pressure between said second predetermined threshold fuel pressure and a third predetermined threshold fuel pressure that is higher than said second predetermined threshold fuel pressure, wherein at a fuel pressure greater than said third predetermined threshold fuel pressure, said fuel flow opening area remains constant.

2. The fuel injector according to claim 1, further comprising means for adjusting fuel flow corresponding to said third predetermined threshold fuel pressure.

3. A fuel injector according to claim 2, wherein said means for adjusting comprises an abutment for limiting the stroke of said second valve to a determined value which corresponds to a maximum desired value for the flow rate of fuel injection.

4. A fuel injector according to claim 3, wherein said stroke-limiting abutment comprises a ring fixed to said second valve and designed to co-operate with a bushing in which said second valve can move.

5. A turbomachine combustion chamber comprising a plurality of fuel injectors according to claim 2.

6. The fuel injector according to claim 4, wherein said second valve includes a valve head shaped so as to define said fuel flow opening that progressively increases in area as said second valve moves in response to a fuel pressure between said second predetermined threshold fuel pressure and said third predetermined threshold fuel pressure.

7. A metering valve comprising:

a bushing having terminus first and second edges;

a hollow elongate valve member slidably disposed within said bushing along an axial direction of said valve member, said valve member having opposing open and closed ends and a flow metering valve head located at said closed end, said valve member further including at least one transverse bore formed therethrough adjacent said closed end, wherein said valve head includes a shoulder sized so as to be selectively engageable said terminus first end edge of said bushing, and a radially inwardly tapering exterior diameter in the axial direction away from said shoulder and towards said open end, wherein an annular volume is defined between an interior of said bushing and an exterior of said valve member, a first axial end of said annular volume being selectively closed by engagement between said shoulder and said first end edge of said bushing and a second axial end of said annular volume opposite said valve head being substantially closed, an interior of said valve member being in communication with said annular volume through said at least one transverse bore, wherein said radially inwardly tapering exterior diameter of said valve head defines an annular flow opening that increases in area as said shoulder moves away from engagement with said first end edge of said bushing, the extent of movement of said shoulder away from engagement with said first end edge of said bushing being selectively limited such that the change in area of said annular flow opening is limited.

8. The metering valve according to claim 7, further comprising a mechanical stop mounted on said valve member a predetermined distance away from said bushing when said shoulder and said first end edge of said bushing are engaged and arranged to selectively abut said bushing to limit the motion of said valve member relative to said bushing, whereby the extent of movement of said shoulder away from engagement with said first end edge of said bushing is limited.

9. The metering valve according to claim 7, further comprising a resilient bias mechanism to bias said valve member towards a position in which said shoulder and said first end edge of said bushing are engaged.

10. The metering valve according to claim 9, wherein said valve member is responsive a fluid pressure applied thereto, said bias mechanism resisting the effect of the fluid pressure applied thereto up to a threshold fluid pressure, after which the fluid pressure applied thereto is sufficient to move said valve member including said shoulder out of engagement with said first end edge of said bushing.

11. The metering valve according to claim 10, wherein the extent of movement of said shoulder away from said first end edge of said bushing it proportional to the fluid pressure above said threshold fluid pressure such that said annular flow opening correspondingly increases in area up to the limit of movement of said shoulder away from said first end edge of said bushing, after which said annular flew opening has a constant area independent of increasing fluid pressure.

12. The metering valve according to claim 11, further comprising a mechanical stop mounted on said valve member a predetermined distance away from said bushing when said shoulder and said first end edge of said bushing are engaged, said mechanical stop being arranged to selectively abut said bushing to limit the motion of said valve member relative to said bushing and, in turn, the extent of movement of said shoulder away from engagement with said first end edge of said bushing, wherein said constant area annular flow opening can be selected as a function of said predetermined distance between said mechanical stop and said bushing.

13. The metering valve according to claim 12, wherein said stop is a ring member mounted on an exterior of said valve member and arranged to abut said second end edge of said bushing to limit the motion of said valve member relative to said bushing.

14. The metering valve according to claim 12, wherein said predetermined distance between said mechanical stop and said bushing is variable by changing the position of said mechanical stop.

15. The metering valve according to claim 12, wherein said predetermined distance between said mechanical stop and said bushing is variable by changing a dimension of said mechanical stop.

16. A fuel injector comprising:

an injector body including a fuel inlet and first and second fuel outlet paths, a portion of the admitted fuel leaving said injector body through said first fuel outlet path;

a metering valve located in said injector body and comprising:

a bushing having first and second end edges;

a hollow elongate valve member slidably disposed within said bushing along an axial direction of said valve member, said valve member having opposing open and closed ends and a flow metering valve head located at said closed end, said valve member further including at least one transverse bore formed therethrough adjacent said closed end, wherein said valve head includes a shoulder sized so as to be selectively engageable with said first end edge of said bushing, and a radially inwardly tapering exterior diameter in the axial direction away from said shoulder, wherein an annular volume is defined between an interior of said bushing and an exterior of said valve member, a first axial end of said annular volume being selectively closed by engagement between said shoulder and said first end edge of said bushing and a second axial end of said annular volume opposite said valve head being substantially closed, an interior of said valve member being in communication with said annular volume through said at least one transverse bore, wherein said radially inwardly tapering exterior diameter of said valve head defines an annular flow opening that increases in area as said shoulder moves away from engagement with said first end edge of said bushing, the extent of movement of said shoulder away from engagement with said first end edge of said bushing being limited;

wherein said second fuel outlet path is defined by said valve member having said open end thereof in communication with said interior of said injector body, said annular volume between said bushing and said valve member, and said annular flow opening selectively provided between said first end edge of said bushing and said valve head.

17. In a turbomachine combustion chamber including a plurality of fuel injectors constructed and arranged to introduce fuel into the combustion chamber, a method for adjusting a fuel flow from each fuel injector into the combustion chamber so as to conform with a desired relationship between fuel pressure and fuel flow rate, the method comprising:

providing a metering valve in each fuel injector, each metering valve being constructed and arranged to present a fuel flow opening through which fuel can pass through the metering valve, the area of the fuel flow opening varying in proportion to a fuel pressure exerted on the metering valve between a first fuel pressure at which the metering valve is actuated and a second fuel pressure greater than the first fuel pressure, wherein at fuel pressures above the second fuel pressure, the area of the fuel flow opening area remains constant;

identifying a fuel pressure at which a desired fuel flow rate out of the fuel injector occurs; and limiting the mechanical operation of the metering valve so that the second fuel pressure is made equal to the fuel pressure at which the desired fuel flow rate occurs, such the fuel flow opening area remains constant at fuel pressures above the fuel pressure at which the desired fuel flow rate occurs.

18. The method according to claim 17, wherein the metering valve comprises a valve member actuable in response to fuel pressure exerted thereon, the valve member having a valve head for selectively closing off a fuel path through the metering valve, the valve head being shaped so as to present the fuel flow opening as the valve member moves away from a position in which the fuel path is closed off, wherein limiting the mechanical operation of the metering valve comprises restricting the extent of movement of the valve member away from the position in which the fuel flow path is closed off, at which position under the influence of fuel pressure at or greater than the second fuel pressure the fuel flow opening area is held constant.

19. The method according to claim 18, wherein restricting the extent of movement of the valve member comprises providing a mechanical stop located so as to abuttingly restrict the motion of the valve member.

20. The method according to claim 19, wherein said mechanical stop is located on said valve member in a location so as to abut another portion of the metering valve other than the valve member.

21. The method according to claim 19, wherein the mechanical stop is located at a position so as to prevent movement of the valve member beyond the position of the valve member under the influence of the second pressure applied thereto.

22. The method according to claim 21 wherein limiting the mechanical operation of the metering valve comprises changing the position of mechanical stop so as to adjust the extent of movement of the valve member permitted.

23. The method according to claim 21, wherein limiting the mechanical operation of the metering valve comprises altering a dimension of the mechanical stop so as to adjust the extent of movement of the valve member permitted.

24. The method according to claim 22, wherein said mechanical stop is a sleeve member mounted on the valve member and arranged to selectively abut against a portion of the metering valve other than the valve member having the sleeve member mounted thereon.

25. The method according to claim 23, wherein altering a dimension of the mechanical stop comprises mechanical milling to alter a length of the sleeve member.

26. The method according to claim 18, wherein a valve member in one of the fuel injectors has an extant of movement that is different from another valve member in another one of the fuel injectors.

27. A fuel injector comprising:

an injector body including an inlet for receiving fuel under pressure and first and second fuel outlet paths, a first portion of the fuel in said injector body leaving said injector body through said first fuel outlet path;

a valve associated only with said second fuel outlet path and being responsive to a first predetermined threshold fuel pressure so as to selectively permit another portion of the fuel in said injector body to leave said injector body through said second fuel outlet path, said valve including a fuel flow opening that increasingly varies in area in proportion to a fuel pressure between said predetermined threshold fuel pressure and a second predetermined threshold fuel pressure that is higher than said first predetermined threshold fuel pressure, wherein at a fuel pressure greater than said second predetermined threshold fuel pressure, said fuel flow opening area remains constant.

28. The fuel injector according to claim 27, further comprising means for adjusting fuel flow corresponding to said second predetermined threshold fuel pressure.

29. The fuel injector according to claim 27, wherein said second valve includes a valve head shaped so as to define said fuel flow opening that progressively increases in area as said second valve moves in response to a fuel pressure between said second predetermined threshold fuel pressure and said third predetermined threshold fuel pressure.

30. A metering valve comprising:

a bushing having terminus first and second edges;

an elongate valve member slidably disposed within said bushing along an axial direction of said valve member, said valve member having opposing first and second ends and a flow metering valve head located at said second end, wherein said valve head includes a shoulder sized so as to be selectively engageable with said terminus first end edge of said bushing, and a radially inwardly tapering exterior diameter in the axial direction away from said shoulder and towards said first end of said valve member, wherein an annular volume is defined between an interior of said bushing and an exterior of said valve member, an axial end of said annular volume being selectively closed by engagement between said shoulder and said first end edge of said bushing, said annular volume communicating with a fluid inlet to receive a fluid to be metered by the selective engagement between said shoulder and said first end edge of said bushing, wherein said radially inwardly tapering exterior diameter of said valve head defines an annular flow opening that increases in area as said shoulder moves away from engagement with said first end edge of said bushing, the extent of movement of said shoulder away from engagement with said first end edge of said bushing being selectively limited such that the change in area of said annular flow opening is limited.

31. The metering valve according to claim 30, further comprising a mechanical stop mounted on said valve member a predetermined distance away from said bushing when said shoulder and said first end edge of said bushing are engaged and arranged to selectively abut said bushing to limit the motion of said valve member relative to said bushing, whereby the extent of movement of said shoulder away from engagement with said first end edge of said bushing is limited.

32. The metering valve according to claim 30, further comprising a resilient bias mechanism to bias said valve member towards a position in which said shoulder and said first end edge of said bushing are engaged.

33. The metering valve according to claim 32, wherein said valve member is responsive to a fluid pressure applied thereto, said bias mechanism resisting the effect of the fluid pressure applied thereto up to a threshold fluid pressure, after which the fluid pressure applied thereto is sufficient to move said valve member including said shoulder out of engagement with said first end edge of said bushing.

34. The metering valve according to claim 33, wherein the extent of movement of said shoulder away from said first end edge of said bushing is proportional to the fluid pressure above said threshold fluid pressure such that said annular flow opening correspondingly increases in area up to the limit of movement of said shoulder away from said first end edge of said bushing, after which said annular flow opening has a constant area independent of increasing fluid pressure.

35. The metering valve according to claim 34, further comprising a mechanical stop mounted on said valve member a predetermined distance away from said bushing when said shoulder and said first end edge of said bushing are engaged, said mechanical stop being arranged to selectively abut said bushing to limit the motion of said valve member relative to said bushing and, in turn, the extent of movement of said shoulder away from engagement with said first end edge of said bushing, wherein said constant area annular flow opening can be selected as a function of said predetermined distance between said mechanical stop and said bushing.

36. The metering valve according to claim 35, wherein said stop is a ring member mounted on an exterior of said valve member and arranged to abut said second end edge of said bushing to limit the motion of said valve member relative to said bushing.

37. The metering valve according to claim 34, wherein said predetermined distance between said mechanical stop and said bushing is variable by changing the position of said mechanical stop.

38. The metering valve according to claim 35, wherein said predetermined distance between said mechanical stop and said bushing is variable by changing a dimension of said mechanical stop.

* * * * *